(12) United States Patent
Winward et al.

(10) Patent No.: US 12,552,408 B2
(45) Date of Patent: Feb. 17, 2026

(54) OPERATOR INSTIGATED FALSE POSITIVE MUTING FOR AUTONOMOUS VEHICLES

(71) Applicant: Autonomous Solutions, Inc., Mendon, UT (US)

(72) Inventors: Garrett Winward, Mendon, UT (US); Nathan Merkley, Mendon, UT (US); Taylor Bybee, Mendon, UT (US); Daniel Morwood, Mendon, UT (US); Levi Baker, Mendon, UT (US); Benjamin Call, Mendon, UT (US); Jeff Ferrin, Mendon, UT (US); Brad Bailio, Mendon, UT (US); Richard Hoyt, Mendon, UT (US)

(73) Assignee: Autonomous Solutions, Inc., Mendon, UT (US)

( * ) Notice: Subject to any disclaimer, the term of this patent is extended or adjusted under 35 U.S.C. 154(b) by 0 days.

(21) Appl. No.: 18/757,025

(22) Filed: Jun. 27, 2024

(65) Prior Publication Data

US 2025/0002039 A1    Jan. 2, 2025

Related U.S. Application Data

(60) Provisional application No. 63/510,407, filed on Jun. 27, 2023.

(51) Int. Cl.
*B60W 10/04* (2006.01)
*B60W 10/18* (2012.01)
(Continued)

(52) U.S. Cl.
CPC .......... *B60W 60/001* (2020.02); *B60W 10/04* (2013.01); *B60W 10/18* (2013.01);
(Continued)

(58) Field of Classification Search
CPC ...... B60W 10/04; B60W 10/18; B60W 10/20; B60W 30/09; B60W 60/001; G05D 1/0011
See application file for complete search history.

(56) References Cited

U.S. PATENT DOCUMENTS

| | | |
|---|---|---|
| 6,198,992 B1 | 3/2001 | Winslow |
| 11,247,672 B2 * | 2/2022 | Wieschemann ....... B60W 30/16 |

(Continued)

OTHER PUBLICATIONS

International Search Report and Written Opinion in PCT Application No. PCT/US24/35833 mailed Oct. 21, 2024, 8 pages.

*Primary Examiner* — Anshul Sood

(57) ABSTRACT

An autonomous vehicle system and method is disclosed that allows an operator to override a stop command issued from an obstacle detection and avoidance subsystem of the autonomous vehicle. Most autonomous vehicles include an obstacle detection and avoidance subsystem that detects potential obstacles along the path of the autonomous vehicle and may send a command to stop the autonomous vehicle. When the obstacle detection and avoidance subsystem detects a potential obstacle (regardless of whether the potential obstacle does or does not exist) and the path is still traversable, the autonomous vehicle may still stop unnecessarily. The disclosed system and methods will allow an operator to override commands issued by the obstacle detection and avoidance subsystem and allow the autonomous vehicle to continue along the path regardless of any potential obstacle.

13 Claims, 3 Drawing Sheets

(51) Int. Cl.
 *B60W 10/20* (2006.01)
 *B60W 30/09* (2012.01)
 *B60W 60/00* (2020.01)
 *G08G 1/09* (2006.01)

(52) U.S. Cl.
 CPC ............ *B60W 10/20* (2013.01); *B60W 30/09* (2013.01); *G08G 1/09* (2013.01)

(56) References Cited

U.S. PATENT DOCUMENTS

| | | |
|---|---|---|
| 2015/0301532 A1 | 10/2015 | Norris et al. |
| 2017/0192431 A1* | 7/2017 | Foster .................. A01B 79/005 |
| 2018/0224850 A1* | 8/2018 | Kroop ...................... G08G 1/00 |
| 2020/0339112 A1* | 10/2020 | Rosenzweig ..... B60W 30/0953 |
| 2020/0409363 A1* | 12/2020 | Gogna ................. G08G 1/0112 |
| 2021/0323573 A1* | 10/2021 | Gogna ............... G01C 21/3407 |
| 2022/0161815 A1 | 5/2022 | Van Beek et al. |
| 2023/0132029 A1* | 4/2023 | Gao ..................... G05D 1/0011 |
| | | 701/24 |

* cited by examiner

OPERATOR INSTIGATED FALSE POSITIVE MUTING FOR AUTONOMOUS VEHICLES

BACKGROUND

An autonomous vehicle may follow a path through an external environment. The autonomous vehicle may sense the external environment for any obstacles that may exist along the path. Typically, when an obstacle is found on the path, the autonomous vehicle is programmed to stop, slow, or take some other action until the obstacle can be removed or an updated path can be created.

SUMMARY

Methods and systems are disclosed for controlling an autonomous vehicle. A method, for example, may include receiving a path from the base station; operating the autonomous vehicle along the path; sensing the external environment to produce sensor data; identifying a location of an obstacle along the path from the sensor data; decelerating the autonomous vehicle prior to reaching the obstacle; sending an obstacle message to a base station, wherein the obstacle message includes the location of the obstacle; receiving an override message from the base station; and in response to receiving the override message, operating the autonomous vehicle along the path past the location of the obstacle. The method may also include operating the autonomous vehicle along a path within an external environment includes moving the autonomous vehicle along the path at a first speed; and operating the autonomous vehicle along the path past the location of the obstacle further comprises moving the autonomous vehicle along the path at a second speed, wherein the second speed is less than the first speed. The obstacle message, for example, includes at least a portion of the sensor data.

An autonomous vehicle is also disclosed that may include a transceiver that communicates with and receives data from at least a base station; a speed control system that controls the speed of the autonomous vehicle; a steering control system that controls the steering of the autonomous vehicle; and a controller communicatively coupled with the sensor array, the transceiver, and the speed control system. The controller has code that receives a path from the base station via the transceiver; sends commands to the steering control system and the speed control system that when executed move the autonomous vehicle along the path within an external environment; senses the external environment to produce sensor data; identifies a location of an obstacle along the path from the sensor data; sends commands to the speed control system decelerate the autonomous vehicle prior to reaching the obstacle; sends an obstacle message to a base station, wherein the obstacle message includes the location of the obstacle; receives an override message from the base station via the transceiver; and in response to receiving the override message, sends commands to the steering control system and the speed control system that when executed move the autonomous vehicle along the path past the location of the obstacle.

Another example method may include sending a path within an external environment to an autonomous vehicle; receiving an obstacle message from the autonomous vehicle, wherein the obstacle message includes the location of the obstacle; providing an operator interface with an override button; receiving an indication from the operator interface an operator selected the button; and in response to receiving an indication from the operator, sending an override message to the autonomous vehicle.

The various embodiments described in the summary and this document are provided not to limit or define the disclosure or the scope of the claims.

DETAILED DESCRIPTION

An autonomous vehicle system and method is disclosed that allows an operator to override a stop command issued from an obstacle detection and avoidance subsystem of the autonomous vehicle. Most autonomous vehicles include an obstacle detection and avoidance subsystem that detects potential obstacles along the path of the autonomous vehicle and may send a command to stop the autonomous vehicle. When the obstacle detection and avoidance subsystem detects a potential obstacle (regardless of whether the potential obstacle does or does not exist) and the path is still traversable, the autonomous vehicle may still stop unnecessarily. The disclosed system and methods will allow an operator to override commands issued by the obstacle detection and avoidance subsystem and allow the autonomous vehicle to continue along the path.

For example, after an autonomous vehicle stops for an obstacle or identifies an obstacle, the autonomous vehicle may report the obstacle to a base station. The base station, for example, may display an indication on a display indicating that the autonomous vehicle has been stopped or will soon stop due to the obstacle. The operator may then view images and/or data produced by cameras or sensors to see if the detection would impede the progress of the autonomous vehicle. The operator may then, if so desired, elect to ignore the obstacle and allow the autonomous vehicle to proceed. The operator, for example, may press and hold a button to override or mute the obstacle detection and avoidance subsystem. In response to holding the button, a signal can be sent to the obstacle detection and avoidance subsystem, which prevents the autonomous vehicle from sending stopping distance messages to the vehicle. During this mode of operation, the operating speed of the vehicle may be reduced. When the button is released, or if the signal is otherwise interrupted, normal obstacle detection behavior resumes.

Figure 1:
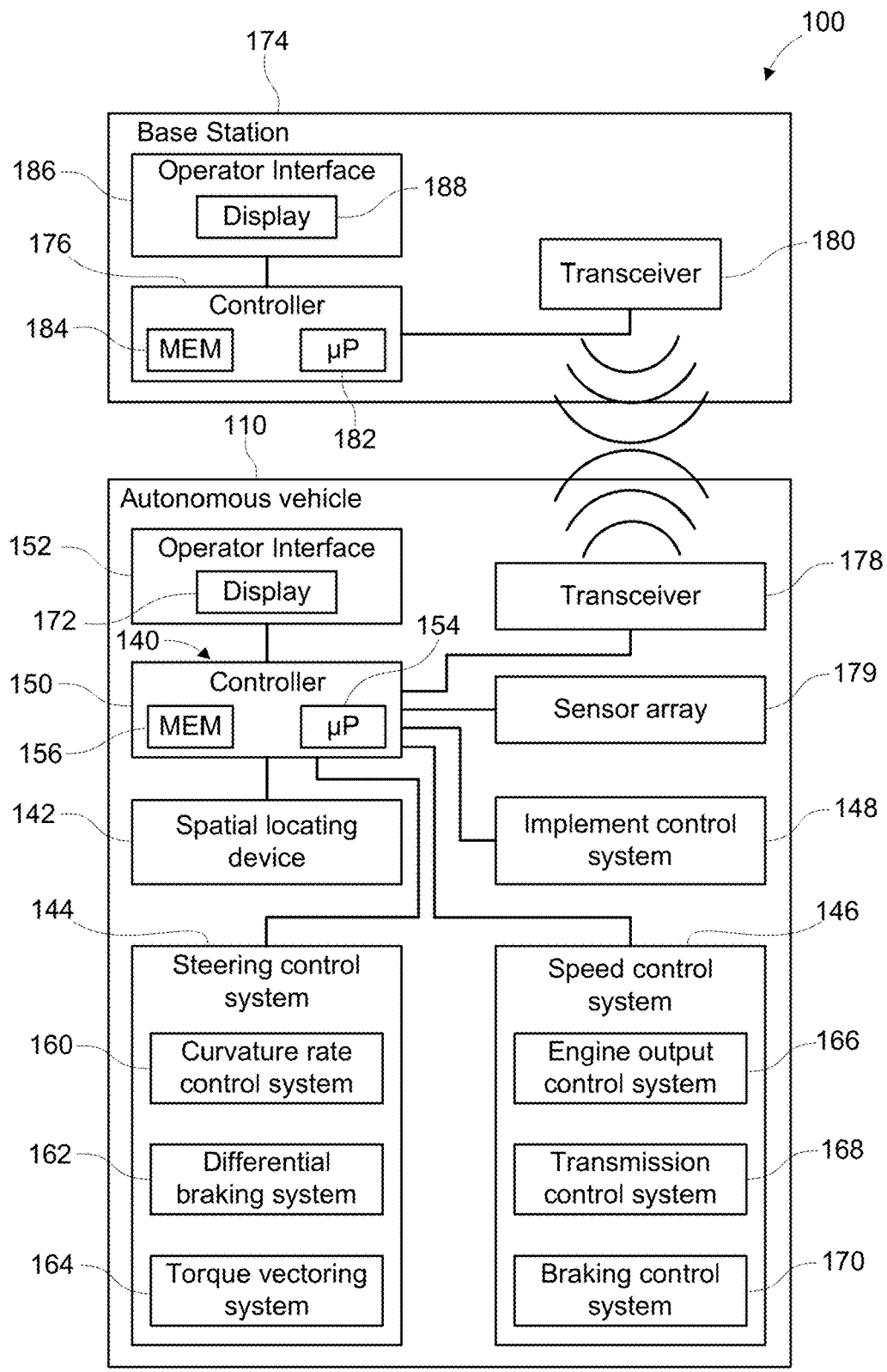
FIG. 1 is a block diagram of a communication and control system for an autonomous vehicle.

FIG. 1 is a block diagram of a communication and control system 100. The communication and control system 100, for example, may include an autonomous vehicle 110 in communication with a base station 174. The autonomous vehicle 110, for example, may include an automobile, a truck, a van, an electric vehicle, a combustion vehicle, a loader, wheel loader, a track loader, a dump truck, a digger, a backhoe, a forklift, etc. Various components of the communication and control system 100, for example, may include any or all components of computational system 300 shown in FIG. 3.

The autonomous vehicle 110, for example, may include a steering control system 144 that may control a direction of movement of the autonomous vehicle 110. The steering control system 144, for example, may include any or all components of computational system 300 shown in FIG. 3.

The autonomous vehicle 110, for example, may include a speed control system 146 that controls a speed of the autonomous vehicle 110. The autonomous vehicle 110, for example, may include an implement control system 148 that may control operation of an implement coupled with or towed by the autonomous vehicle 110 or integrated within the autonomous vehicle 110. The implement control system 148, for example, may include any type of implement such as, for example, a bucket, a shovel, a blade, a thumb, a dump bed, a plow, an auger, a trencher, a scraper, a broom, a hammer, a grapple, forks, boom, spears, a cutter, a wrist, a tiller, a rake, etc. The speed control system 146, for example, may include any or all components of computational system 300 shown in FIG. 3.

The control system 140, for example, may include a controller 150 communicatively coupled to the steering control system 144, to the speed control system 146, and the implement control system 148. The control system 140, for example, may be integrated into a single control system. The control system 140, for example, may include a plurality of distinct control systems. The control system 140, for example, may include any or all the components of computational system 300 shown in FIG. 3.

The controller 150, for example, may receive signals relative to many parameters of interest including, but not limited to: vehicle position, vehicle speed, vehicle heading, desired path location, off-path normal error, desired off-path normal error, heading error, vehicle state vector information, curvature state vector information, turning radius limits, steering angle, steering angle limits, steering rate limits, curvature, curvature rate, rate of curvature limits, roll, pitch, rotational rates, acceleration, and the like, or any combination thereof.

The controller 150, for example, may be an electronic controller with electrical circuitry configured to process data from the various components of the autonomous vehicle 110. The controller 150 may include a processor, such as the processor 154, and a memory device 156. The controller 150 may also include one or more storage devices and/or other suitable components (not shown). The processor 154 may be used to execute software, such as software for calculating drivable path plans. Moreover, the processor 154 may include multiple microprocessors, one or more "general-purpose" microprocessors, one or more special-purpose microprocessors, and/or one or more application specific integrated circuits (ASICS), or any combination thereof. For example, the processor 154 may include one or more reduced instruction set (RISC) processors. The controller 150, for example, may include any or all the components of computational system 300 shown in FIG. 3.

The controller 150 may be in communication with a spatial locating device 142 such as, for example, a GPS device. The spatial locating device 142 may provide geolocation data to the controller 150.

The memory device 156, for example, may include a volatile memory, such as random access memory (RAM), and/or a nonvolatile memory, such as ROM. The memory device 156 may store a variety of information and may be used for various purposes. For example, the memory device 156 may store processor-executable instructions (e.g., firmware or software) for the processor 154 to execute, such as instructions for calculating drivable path plan, and/or controlling the autonomous vehicle 110. The memory device 156 may include flash memory, one or more hard drives, or any other suitable optical, magnetic, or solid-state storage medium, or a combination thereof. The memory device 156 may store data such as field maps, maps of desired paths, vehicle characteristics, software or firmware instructions and/or any other suitable data.

The steering control system 144, for example, may include a curvature rate control system 160, a differential braking system 162, a steering mechanism, and a torque vectoring system 164 that may be used to steer the autonomous vehicle 110. The curvature rate control system 160, for example, may control a direction of an autonomous vehicle 110 by controlling a steering control system of the autonomous vehicle 110 with a curvature rate, such as an Ackerman style autonomous loader, 110 or articulating loader. The curvature rate control system 160, for example, may automatically rotate one or more wheels or tracks of the autonomous vehicle 110 via hydraulic or electric actuators to steer the autonomous vehicle 110. For example, the curvature rate control system 160 may rotate front wheels/tracks, rear wheels/tracks, and/or intermediate wheels/tracks of the autonomous vehicle 110 or articulate the frame of the loader, either individually or in groups. The differential braking system 162 may independently vary the braking force on each lateral side of the autonomous vehicle 110 to direct the autonomous vehicle 110. Similarly, the torque vectoring system 164 may differentially apply torque from the engine to the wheels and/or tracks on each lateral side of the autonomous vehicle 110. While the steering control system 144 includes the curvature rate control system 160, the differential braking system 162, and/or the torque vectoring system 164. A steering control system 144, for example, may include other and/or additional systems to facilitate turning the autonomous vehicle 110 such as an articulated steering control system, a differential drive system, and the like.

The speed control system 146, for example, may include an engine output control system 166, a transmission control system 168, and a braking control system 170. The engine output control system 166 may vary the output of the engine to control the speed of the autonomous vehicle 110. For example, the engine output control system 166 may vary a throttle setting of the engine, a fuel/air mixture of the engine, a timing of the engine, and/or other suitable engine parameters to control engine output. In addition, the transmission control system 168 may adjust gear selection within a transmission to control the speed of the autonomous vehicle 110. Furthermore, the braking control system 170 may adjust braking force to control the speed of the autonomous vehicle 110. While the illustrated speed control system 146 includes the engine output control system 166, the transmission control system 168, and/or the braking control system 170. A speed control system 146, for example, having other and/or additional systems to facilitate adjusting the speed of the autonomous vehicle 110 may be included.

The implement control system 148, for example, may control various parameters of the implement towed by and/or integrated within the autonomous vehicle 110. For example, the implement control system 148 may instruct an implement controller via a communication link, such as a CAN bus, ISOBUS, Ethernet, wireless communications, and/or Broad R Reach type Automotive Ethernet, etc.

The implement control system 148, for example, may instruct an implement controller to adjust a penetration depth of at least one ground engaging tool of an agricultural implement, which may reduce the draft load on the autonomous vehicle 110.

The implement control system 148, as another example, may instruct the implement controller to transition an agricultural implement between a working position and a transport portion, to adjust a flow rate of product from the agricultural implement, to adjust a position of a header of the agricultural implement (e.g., a harvester, etc.), among other operations, etc.

The implement control system 148, as another example, may instruct the implement controller to adjust a shovel height, a shovel angle, a shovel position, etc.

The implement control system 148, as another example, may instruct the implement controller to adjust a shovel height, a shovel angle, a shovel position, etc.

The controller 150, for example, may be coupled with a sensor array 179. The sensor array 179, for example, may facilitate determination of condition(s) of the autonomous vehicle 110 and/or the work area. For example, the sensor array 179 may include one or more sensors (e.g., infrared sensors, ultrasonic sensor, magnetic sensors, radar sensors, Lidar sensors, terahertz sensors, sonar sensors, cameras, etc.). On or more of the sensors may monitor a rotation rate of a respective wheel or track and/or a ground speed of the autonomous vehicle 110. The sensors may also monitor operating levels (e.g., temperature, fuel level, etc.) of the autonomous vehicle 110. Furthermore, the sensors may monitor conditions in and around the work area, such as temperature, weather, wind speed, humidity, and other conditions. The sensors, for example, may detect physical objects in the work area, such as the parking stall, the material stall, accessories, other vehicles, other obstacles, or other object(s) that may in the area surrounding the autonomous vehicle 110. Further, the sensor array 179 may be utilized by the first obstacle avoidance system, the second obstacle avoidance system, or both.

The operator interface 152, for example, may be communicatively coupled to the controller 150 and configured to present data from the autonomous vehicle 110 via a display 172. Display data may include data associated with operation of the autonomous vehicle 110, data associated with operation of an implement, a position of the autonomous vehicle 110, a speed of the autonomous vehicle 110, a desired path, a drivable path plan, a target position, a current position, etc. The operator interface 152 may enable an operator to control certain functions of the autonomous vehicle 110 such as starting and stopping the autonomous vehicle 110, inputting a desired path, etc. The operator interface 152, for example, may enable the operator to input parameters that cause the controller 150 to adjust the drivable path plan. For example, the operator may provide an input requesting that the desired path be acquired as quickly as possible, that an off-path normal error be minimized, that a speed of the autonomous vehicle 110 remain within certain limits, that a lateral acceleration experienced by the autonomous vehicle 110 remain within certain limits, etc. In addition, the operator interface 152 (e.g., via the display 172, or via an audio system (not shown), etc.) may alert an operator if the desired path cannot be achieved, for example.

The control system 140, for example, may include a base station 174 having a base station controller 176 located remotely from the autonomous vehicle 110. For example, control functions of the control system 140 may be distributed between the controller 150 of the control system 140 and the base station controller 176. The base station controller 176, for example, may perform a substantial portion of the control functions of the control system 140. For example, a first transceiver 178 positioned on the autonomous vehicle 110 may output signals indicative of vehicle characteristics (e.g., position, speed, heading, curvature rate, curvature rate limits, maximum turning rate, minimum turning radius, steering angle, roll, pitch, rotational rates, acceleration, etc.) to a second transceiver 180 at the base station 174. The first transceiver 178 and/or the second transceiver 180 may include any or all components or features of communications subsystem 330 described below.

The base station controller 176, for example, may calculate drivable path plans and/or output control signals to control the curvature rate control system 160, the speed control system 146, and/or the implement control system 148 to direct the autonomous vehicle 110 toward the desired path, for example. The base station controller 176 may include a processor 182 and memory device 184 having similar features and/or capabilities as the processor 154 and the memory device 156 discussed previously. Likewise, the base station 174 may include an operator interface 186 having a display 188, which may have similar features and/or capabilities as the operator interface 152 and the display 172 discussed previously.

Figure 2:
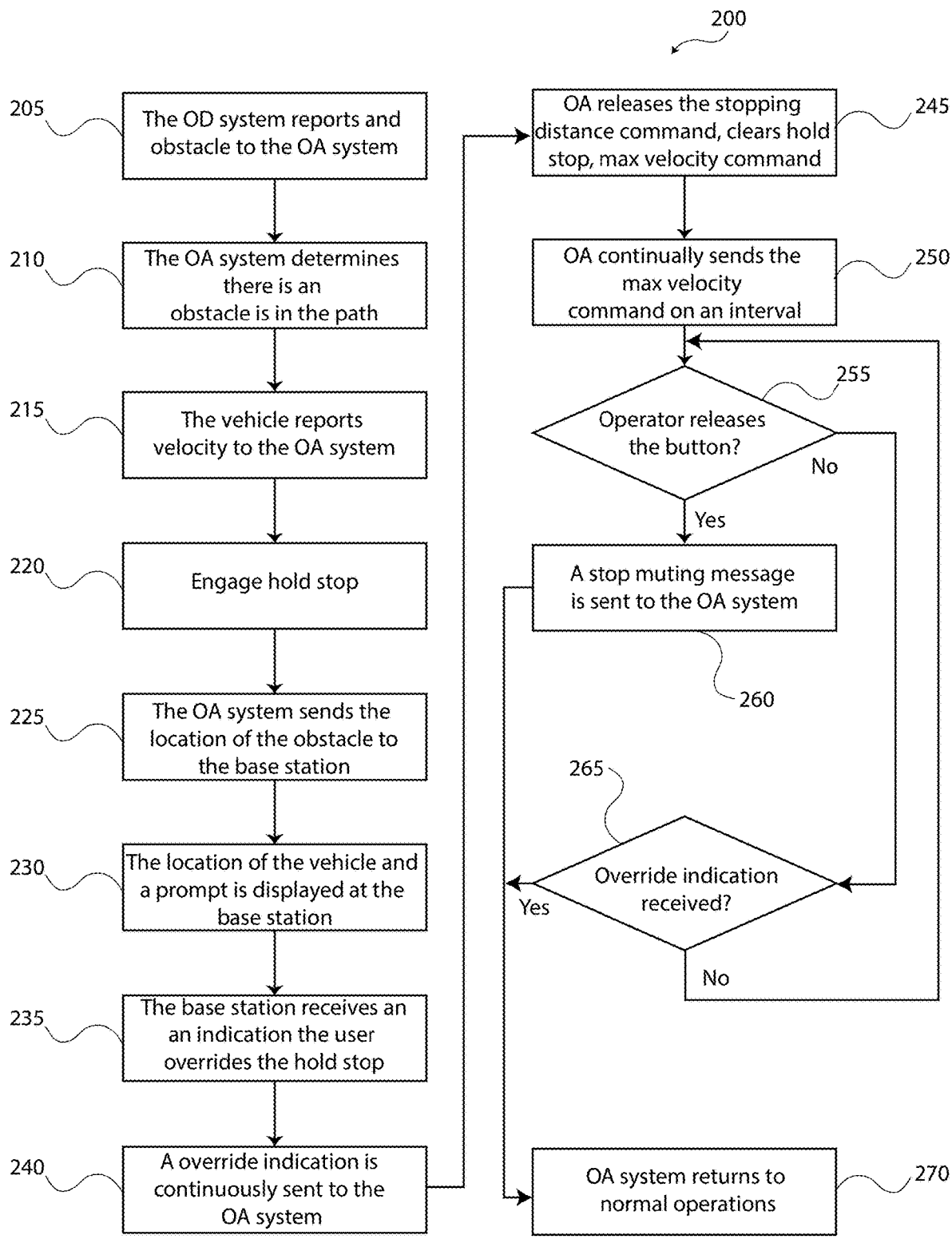
FIG. 2 is a flowchart of a process for an operator to override the obstacle detection and obstacle avoidance subsystems in an autonomous vehicle.

FIG. 2 is a flowchart of a process 200 for an operator to override the obstacle detection and obstacle avoidance subsystems of an autonomous vehicle. Process 200 may be executed in part by either or both the control system 140 and/or base satiation controller 176.

Process 200 starts at block 205. At block 205, the obstacle detection subsystem detects an obstacle within the path of the autonomous vehicle. The obstacle detection subsystem, for example, may detect an obstacle using one or more sensors from sensor array 179. The obstacle detection subsystem may send a message to the obstacle avoidance subsystem specifying details about the detected obstacle. The obstacle detection subsystem may include one or more algorithms, programs, or routines that are executed by control system 140 to detect obstacles within the path of the autonomous vehicle. Any number or type of obstacle detection algorithms or subsystems may be used.

At block 210, the obstacle avoidance subsystem may receive input about the obstacle from the obstacle detection subsystem. The obstacle avoidance subsystem, for example, may determine whether the obstacle can be avoided using a new path. The obstacle avoidance subsystem may determine whether the obstacle can or cannot be avoided. If the obstacle cannot be avoided, the obstacle avoidance subsystem may send commands to the speed control system 146 indicating that the autonomous vehicle must be stopped. The obstacle avoidance subsystem may include one or more algorithms, programs, or routines that are executed by control system 140. Any number or type of obstacle avoidance algorithms or subsystems may be used. The obstacle detection and the obstacle avoidance subsystems may be part of the same subsystem.

At block 215, the sensor array 179, such as, for example, a speedometer or GPS subsystem may report the initial speed of the autonomous vehicle to the obstacle avoidance subsystem. This may, for example, allow the obstacle avoidance subsystem to determine whether the autonomous vehicle should come to a stop or slow down or take other counter measures as it approaches the obstacle.

At block 220, the obstacle avoidance subsystem may send a hold stop message or a similar message. A hold stop message, for example, may require the autonomous vehicle to come to a stop and remain stopped until operator intervention occurs. In response, for example, a stopping distance command, for example, can be set to bring the autonomous vehicle to a stop at a given distance from the object (e.g., the stopping distance). Once the autonomous vehicle has stopped at this stopping distance, the autonomous vehicle may not proceed along any path.

At block 225, which may occur at the same time as block 220, the control system 140 may send an obstacle message to the base station 174 indicating that an obstacle has been detected. The obstacle message, for example, may include the location of the autonomous vehicle, the detected location of the obstacle, and/or the sensor data related to the obstacle.

At block 230, the location of the autonomous vehicle, the location of the obstacle, and/or the sensor data may be displayed on display 172 of the operator interface 152 at the base station 174. The base station 174 may also display on the operator interface 152 a button an operator can interact with that allows the operator to override the hold stop. The button, for example, may include a button that can be pressed on a touch display or pressed via a mouse or other operator interface. The button, for example, may include a physical button at the base station 174 and/or and the operator interface 152 that the operator may press. The operator interface 152 may also display information about how the operator can override the hold stop. In some examples, the operator may be required to continuously hold the button down.

At block 235 the base station 174 receives an indication from an operator to override the hold stop as noted above.

At block 240, while the button is held down, the base station 174 may continuously send an override indication to the obstacle avoidance subsystem at the autonomous vehicle 110. These override indication, for example, may indicate that the button is held down by the operator.

At block 245, the obstacle avoidance subsystem may clear the hold stop command. The obstacle avoidance subsystem may also set the max speed value to a lower speed than the initial speed. This lower speed may be predetermined as a set amount such as, for example, less than 15, 10, 5, 2.5, or 1.0 miles per hour. The stopping distance command, for example, may also be released or cleared.

At block 250, the revised max speed command can be repeatedly sent to the speed control system 146. This command may be repeatedly sent on a preset interval such as, for example, every one, two, or five seconds.

At block 255, the process 200 can determine whether the operator has released the button. If the operator has released the button, the base station 174 can send a stop muting message to the obstacle avoidance subsystem at block 260. Then at block 270 the obstacle avoidance subsystem may return to normal operation.

If, at block 255, the operator has not released the button, the process moves to block 265. At block 265 it can be determined whether the override indication has been received within a preset time period. If the override indication has not been received, then process 200 proceeds to block 270 and the obstacle avoidance subsystem may return to normal operation. If the override indication has been received, process 200 can proceed back to block 255 until either the override indication has been received or the stop muting message has been received.

Figure 3:
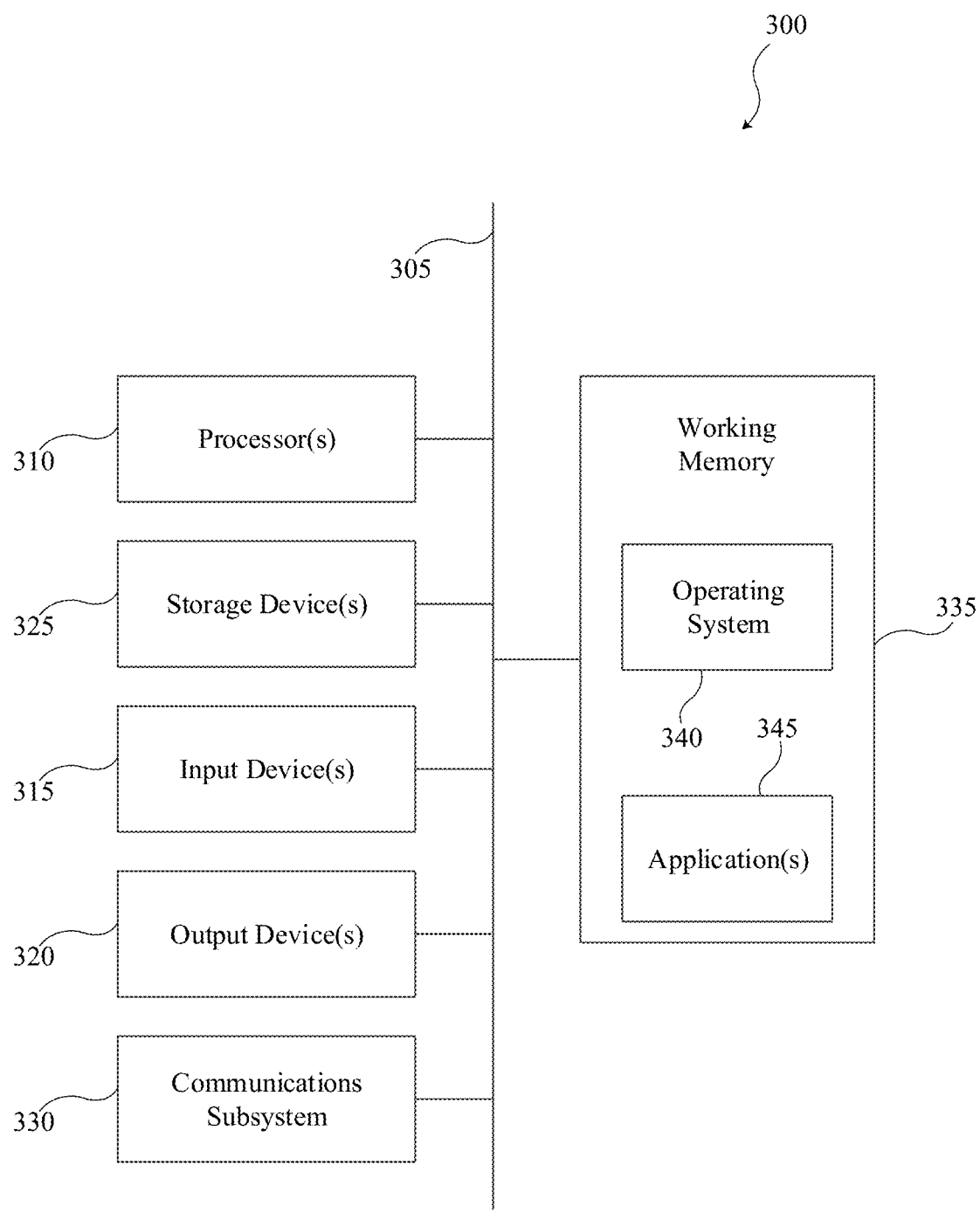
FIG. 3 is a block diagram of a computational system that can be used to with or to perform some embodiments described in this document.

The computational system 300, shown in FIG. 3 can be used to perform any of the embodiments of the invention. For example, computational system 300 can be used to execute process 200. The control system 140, for example, may include one or more components of computational system 300. The 176, for example, may include one or more components of computational system 300. As another example, computational system 300 can perform any calculation, identification and/or determination described here. Computational system 300 includes hardware elements that can be electrically coupled via a bus 305 (or may otherwise be in communication, as appropriate). The hardware elements can include one or more processors 310, including without limitation one or more general-purpose processors and/or one or more special-purpose processors (such as digital signal processing chips, graphics acceleration chips, and/or the like); one or more input devices 315, which can include without limitation a mouse, a keyboard and/or the like; and one or more output devices 320, which can include without limitation a display device, a printer and/or the like.

The computational system 300 may further include (and/or be in communication with) one or more storage devices 325, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 300 might also include a communications subsystem 330, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 330 may permit data to be exchanged with a network (such as the network described below, to name one example), and/or any other devices described in this document. In many embodiments, the computational system 300 will further include a working memory 335, which can include a RAM or ROM device, as described above.

The computational system 300 also can include software elements, shown as being currently located within the working memory 335, including an operating system 340 and/or other code, such as one or more application programs 345, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 325 described above.

In some cases, the storage medium might be incorporated within the computational system 300 or in communication with the computational system 300. In other embodiments, the storage medium might be separate from a computational system 300 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 300 and/or might take the form of source and/or installable code, which, upon compilation and/or installation on the computational system 300 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. An autonomous vehicle comprising:
    a communication interface that receives a first from a base station;
    a controller that operates a breaking braking subsystem, a speed control subsystem, and a steering subsystem to direct the autonomous vehicle along the first path at a first speed;
    a sensor array that senses an external environment to produce sensor data;
    an obstacle detection and avoidance subsystem that identifies a potential obstacle in the first path from the sensor data and determines that the obstacle cannot be avoided by following a second path;
    wherein:
        the controller sends a stop command to the braking subsystem and/or the speed control subsystem to decelerate the autonomous vehicle prior to reaching the obstacle;
        the controller sends an obstacle message to the base station via the communication interface, wherein the obstacle message includes the location of the obstacle;
        the controller receives an override message from the base station via the communication interface;
        the controller repeatedly receives the override message from the base station via the communication interface; and
        in response to repeatedly receiving the override message, the controller using the braking subsystem, speed control subsystem, and steering subsystem directs the autonomous vehicle along the first path at a second speed, wherein the second speed is substantially lower than the first speed, and wherein the second speed is less than 5 miles per hour.

2. The autonomous vehicle according to claim 1, wherein the controller sends a stop command to the braking subsystem and/or the speed control subsystem to stop the autonomous vehicle prior to reaching the obstacle.

3. The autonomous vehicle according to claim 1, wherein the obstacle message includes at least a portion of the sensor data.

4. The autonomous vehicle according to claim 1, wherein if the controller stops receiving the override message from the base station via the communication interface, the controller sends a command to the braking subsystem and/or the speed control subsystem to decelerate the autonomous vehicle prior to reaching the obstacle.

5. A method executing at an autonomous vehicle comprising:
    receiving a first path from a base station;
    operating the autonomous vehicle along the first path at a first speed;
    sensing the external environment to produce sensor data;

identifying a location of a potential obstacle along the first path from the sensor data;

decelerating the autonomous vehicle prior to reaching the obstacle;

sending an obstacle message to a base station, wherein the obstacle message includes the location of the obstacle;

repeatedly receiving an override message from the base station; and in response to repeatedly receiving the override message, operating the autonomous vehicle along the first path at a second speed, wherein the second speed is substantially lower than the first speed, and wherein the second speed is less than 5 miles per hour.

6. The method according to claim 5, further comprising sending a stop command to the braking subsystem and/or a speed control subsystem to stop the autonomous vehicle prior to reaching the obstacle.

7. The method according to claim 5, wherein the obstacle message includes at least a portion of the sensor data.

8. The method according to claim 5, further comprising in response to stop receiving the override message sending a command to a braking subsystem and/or a speed control subsystem to decelerate the autonomous vehicle prior to reaching the obstacle.

9. The method according to claim 5, further comprising receiving the obstacle message at the base station;

providing information about the potential obstacle on an operator interface and providing an override button on the operator interface;

receiving an indication from the operator interface that an operator has interacted with the override button; and in response to receiving an indication from the operator, sending a second override message to the autonomous vehicle.

10. An autonomous vehicle comprising:

a sensor array that produces sensor data;

a transceiver that communicates with and receives data from at least a base station;

a speed control subsystem that controls the speed of the autonomous vehicle;

a steering control subsystem that controls the steering of the autonomous vehicle; and a controller communicatively coupled with the sensor array, the transceiver, the speed control subsystem, and the steering control subsystem; wherein the controller has code that:

receives a first path from the base station via the transceiver;

sends commands to the steering control subsystem and the speed control subsystem that when executed move the autonomous vehicle at a first speed along the first path within an external environment;

senses the external environment to produce sensor data;

identifies a location of a potential obstacle along the first path from the sensor data;

sends commands to the speed control subsystem to stop the autonomous vehicle prior to reaching the obstacle;

sends an obstacle message to a base station, wherein the obstacle message includes the location of the obstacle and at least a portion of the sensor data;

repeatedly receives an override message from the base station via the transceiver; and in response to repeatedly receiving the override message, sends commands to the steering control system and the speed control system that when executed move the autonomous vehicle along the first path at a second speed, wherein the second speed is substantially lower than the first speed.

11. The autonomous vehicle according to claim 10, wherein the second speed is less than 5 miles per hour.

12. The autonomous vehicle according to claim 10, wherein the controller repeatedly receives the override message from the base station via the communication interface, and while the controller is repeatedly receiving the override message, the controller using a braking subsystem, speed control subsystem, and steering subsystem directs the autonomous vehicle along the first path at a first speed.

13. The autonomous vehicle according to claim 12, wherein if the controller stops receiving the override message from the base station via the communication interface, the controller sends a command to a braking subsystem and/or the speed control subsystem to decelerate the autonomous vehicle prior to reaching the obstacle.

* * * * *